United States Patent [19]

Olds et al.

[11] Patent Number: 5,732,351
[45] Date of Patent: Mar. 24, 1998

[54] COMMUNICATION SYSTEM AND METHOD FOR SINGLE CHANNEL HAND-OFFS

[75] Inventors: Keith Andrew Olds; James Powers Redden, both of Mesa, Ariz.; Gerald Joseph Davieau, Eldersburg, Md.

[73] Assignee: Motorola, Inc., Schaumburg, Ill.

[21] Appl. No.: 522,034

[22] Filed: Aug. 31, 1995

[51] Int. Cl.⁶ .............................. H04B 7/00; H04B 7/185; H04Q 7/20; H04J 3/16
[52] U.S. Cl. ...................... 455/436; 455/427; 455/443; 370/321; 370/331; 370/337
[58] Field of Search .................... 455/12.1, 13.1, 455/13.2, 33.1, 33.2, 33.4, 54.1, 56.1, 427, 436, 443; 370/321, 324, 331, 336, 337, 347, 350

[56] References Cited

U.S. PATENT DOCUMENTS

| | | | |
|---|---|---|---|
| 5,103,459 | 4/1992 | Gilhousen et al. | 455/33.1 |
| 5,109,528 | 4/1992 | Uddenfeldt | 455/33.2 |
| 5,408,237 | 4/1995 | Patterson et al. | 342/354 |
| 5,483,664 | 1/1996 | Moritz et al. | 455/12.1 |
| 5,491,717 | 2/1996 | Hall | 455/33.2 |
| 5,559,806 | 9/1996 | Kurby et al. | 455/13.3 |

*Primary Examiner*—Reinhard J. Eisenzopi
*Assistant Examiner*—Sam Bhattachavya
*Attorney, Agent, or Firm*—Gregory J. Gorrie

[57] ABSTRACT

In a satellite communication system (10), a subscriber unit (26) is assigned a communication channel (17). The channel is used in the present cell (54) as well as subsequent cells (54) as the cells move relative to the earth. The channel is assigned using a cost function which includes a distance factor and an isolation factor. The distance factor which is based on a geographic distance between the nearest use of an interfering channel and the subscriber unit's cell. The isolation factor includes an interference potential between two channels. As a result of this channel assignment process, channels become associated with the geographic location of the subscriber unit. Accordingly, subscriber unit communications on the same satellite are handed-off between cells using the same channel making hand-offs invisible to the subscriber unit (26). When a hand-off is needed to another satellite, the same channel may also be used, or a new channel assigned using the cost function.

3 Claims, 6 Drawing Sheets

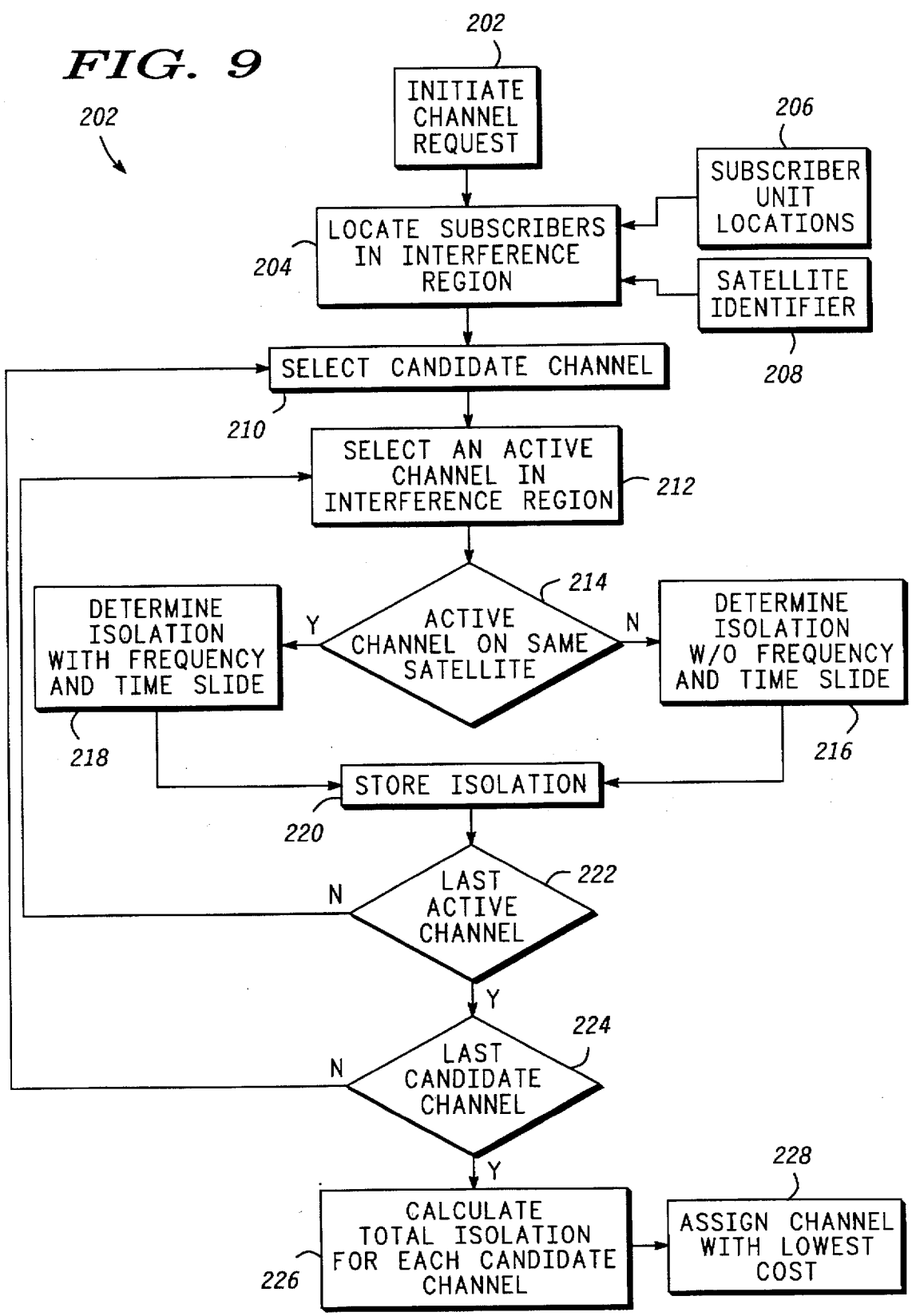

COMMUNICATION SYSTEM AND METHOD FOR SINGLE CHANNEL HAND-OFFS

CROSS-REFERENCE TO RELATED APPLICATIONS

This application is related to co-pending U.S. patent application Ser. Nos. 08/329,926, filed on Dec. 27 of 1994, entitled "METHODS OF DEMAND BASED ADAPTIVE CHANNEL REUSE FOR TELECOMMUNICATION SYSTEMS", 08/258,877, filed on Jun. 13 of 1993, entitled "CELLULAR COMMUNICATION SYSTEM WITH EFFICIENT CHANNEL ASSIGNMENTS AND METHOD THEREFOR", and 08/521,863, entitled "SUBSCRIBER BASED CHANNEL ASSIGNMENT METHOD", filed concurrently herewith, which are assigned to the same assignee as the present application.

FIELD OF THE INVENTION

This invention relates in general to the field of cellular communications. More specifically, the present invention relates to handing-off communications between the cells of a cellular communication system. The present invention also relates to the assignment of channels in a cellular communication system.

BACKGROUND OF THE INVENTION

A cellular communications system projects any number of cells over the earth at diverse locations. A frequency spectrum is then allocated in frequency, in time, by coding, or a combination of these, to the cells so that communications taking place in nearby cells use different channels to minimize the chances of interference. On the other hand, communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results without interference.

One problem which cellular communications systems address is the handing-off of communications between cells. Relative movement between subscriber units and cells causes the subscriber units and the communication links directed thereto to move between cells. In order to permit continuous communications in an ongoing call, the system must "hand-off" the communication when the end user crosses a cell boundary. If a communication is not handed off to a new cell upon leaving an old cell, the communication will eventually be lost because the strength of signals over which communications take place would diminish to a point where the system's radio equipment cannot receive the subscriber unit's transmissions, or vice versa.

A non-geosynchronous orbit (NGO) mobile satellite service system must address the motion of the satellite antenna beam coverage areas relative to the subscriber units. The satellite beams sweep over the earth's service at such a high rate of speed that a given subscriber will move through a number of beams in the course of a particular call. In many cases, a subscriber unit may also be serviced by two or more different satellites during a call.

Typically, a conventional cellular communication system deals with the satellite motion by "handing-off" subscriber units from beam to beam or satellite to satellite when the subscriber unit detects that better service is available in a new beam. Whenever one of these hand-offs occurs, the subscriber unit is assigned a new time/frequency channel in the new beam. Each of these hand-off events requires the exchange of signaling data between the satellite and the subscriber unit. If these signaling messages are not received in a timely manner, the call may be dropped when the current beam no longer provides enough signal strength to maintain the link.

The hand-off rate increases rapidly as the number of beams is increased to provide more antenna gain better link performance or a smaller channel reuse distance. In some satellite systems, there are many antenna beams per satellite. As a result, subscriber units may be hand-off from beam to beam as often as once per minute and between satellites about once in five minutes. When the number of beams is increased or more satellites are used, the beam to beam hand-off interval may be reduced to 15 seconds or less. The additional processing and bandwidth required to support this increased hand-off rate, along with the loss in call completion reliability creates an untenable situation for these "mini-beam" system concepts.

A second problem with the channel to channel hand-off is that channels must be available to receive the hand-off. If no free channel exists in the requested beam, the hand-off cannot be completed and the call may drop. As a result, a pool of available channels must be available for hand-offs.

Thus what is needed are a method and apparatus that reduces the amount of processing and bandwidth required for handing-off communications between cells. What is also needed are a method and apparatus that reduces the hand-off rate and reduces the risk of dropped calls. What is also needed are a method and apparatus for assigning a communication channel to a subscriber unit such that the subscriber unit may use that channel in subsequent cells. What is also needed are a method and apparatus for assigning a communication channel to a subscriber unit such that the subscriber unit may use that channel in subsequent cells of other satellites. What is also needed are a cellular communication system that does not require a pool of channels to be maintained for hand-offs.

BRIEF DESCRIPTION OF THE DRAWINGS

FIG. 9 illustrates a hand-off procedure suitable for use in a preferred embodiment of the present invention.

DETAILED DESCRIPTION OF THE DRAWINGS

The present invention provides, among other things, a cellular communication system that hands-off communications between cells using a single channel. The present invention also provides a method for handing-off communications between cells of a cellular communication system using a single channel. The present invention also provides a method for assigning to a subscriber unit, a channel that may be used within subsequent cells that service the location of the subscriber unit. The present invention also provides a communication system assigns channels that may be used for an entire communication through many cells, wherein the satellites and cells move relative to the earth. The present invention also provides a satellite communication system that assigns a communication channel that remains with a subscriber unit when handed-off between cells.

An advantage to the present invention is that channel allocations are produced that are nearly optimal in maximizing capacity and minimizing system self-interference given a particular antenna beam geometry and beam loading scenario. Another advantage to the present invention is that it provides a non-iterative, parallelizable, implementation which greatly improves the speed of the adaptive channel assignment process. Another advantage of the present invention is that it exploits the available channel orthogonality for any channel multiplexing method. That is, it may be used with FDMA, TDMA , Frequency Hopping CDMA, Direct Sequence CDMA or any combination thereof.

In one embodiment, the channel assignment process includes a measure of channel orthogonality which includes the effects of differential propagation delay and differential Doppler shift. The orthogonality measure is combined with a distance factor for determining channel assignment. In the preferred embodiment, channel orthogonality between all channel pairs in a given system is precomputed.

The present invention is pointed out with particularity in the appended claims. However, a more complete understanding of the present invention may be derived by referring to the detailed description and claims when considered in connection with the figures, wherein like reference numbers refer to similar items throughout the figures.

Figure 1:
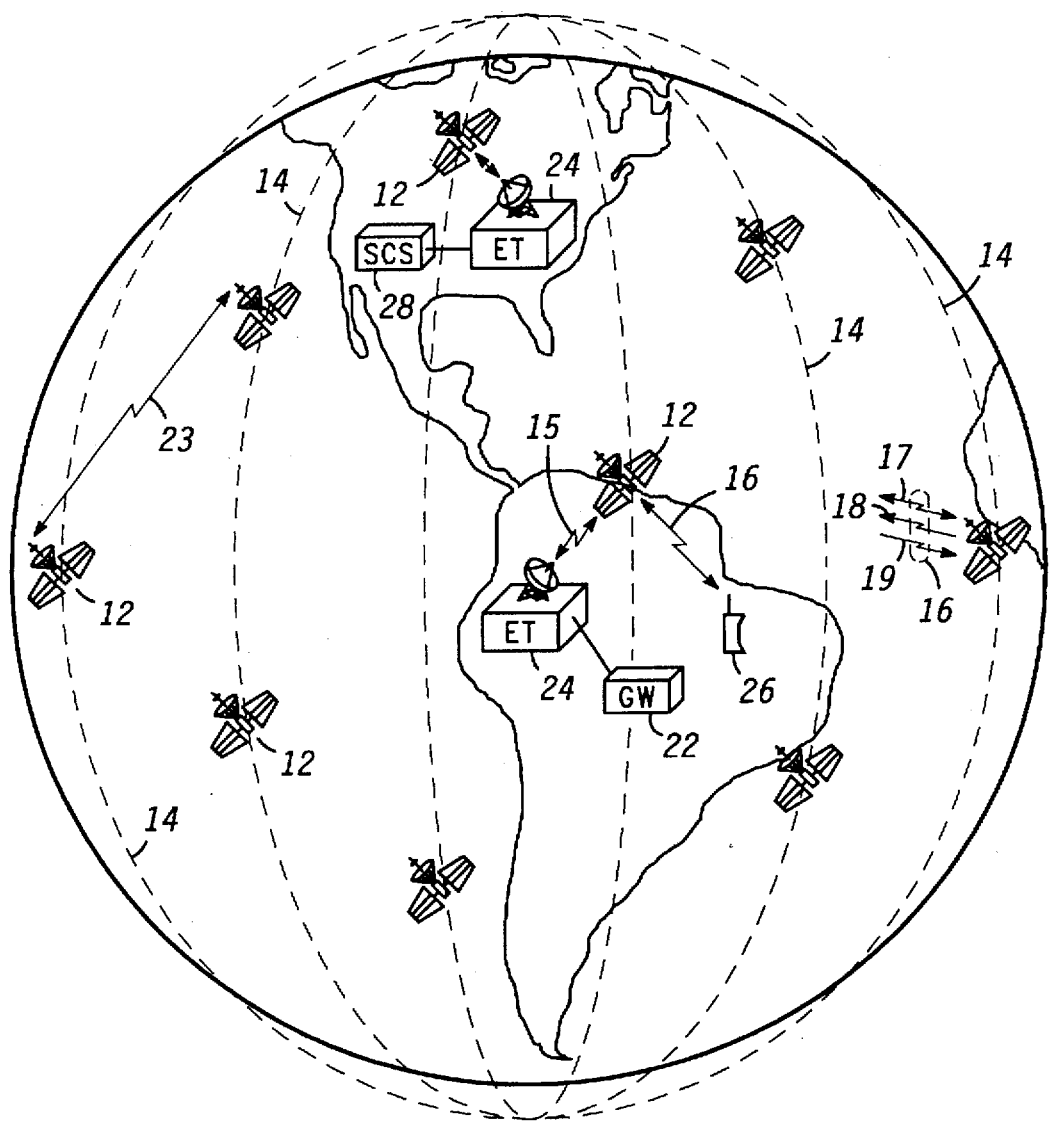
FIG. 1 illustrates a highly simplified diagram of a satellite-based communication system with which the present invention may be practiced.

FIG. 1 illustrates a highly simplified diagram of a satellite-based communication system with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

A "satellite" is defined herein to mean a man-made object or vehicle intended to orbit earth and includes both geostationary and orbiting satellites and/or combinations thereof including low earth orbiting (LEO) satellites and other non-geosynchronous orbits (NGO). A "constellation" is defined herein to mean an ensemble of satellites arranged in orbits for providing specified coverage (e.g., radio communication, photogrammetry, etc.) of portion(s) or all of earth. As used herein the terms "cell", "antenna pattern" and "antenna beam" are not intended to be limited to any particular mode of generation and include those created by either terrestrial or satellite cellular communications systems and/or combinations thereof.

For the example shown in FIG. if each orbit 14 encircles earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of earth at any instant.

In the preferred embodiment, satellites 12 travel with respect to earth at around 25,000 km/hr, allowing satellite 12 to be visible to a subscriber unit for a maximum period of about nine minutes. Although not shown in FIG. 1, the present invention is applicable to systems including satellites having low-earth, medium-earth and geosynchronous orbits. Additionally, it is applicable to orbits having any angle of inclination (e.g., polar, equatorial or other orbital pattern).

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 (e.g., associated with GWs 22 only relay data packets relating to communications in progress).

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones adapted to communicate with satellites 12.

System 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band channels and may encompass Frequency Division Multiplex Access (FDMA), Time Division Multiple Access (TDMA) communications and/or Code Division Multiple Access (CDMA) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19.

Traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each communication, and each traffic channel 17 has sufficient bandwidth to support, as a minimum, a two-way voice conversation. The assignment of traffic channels 17 is discussed below.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

Accordingly, communication system 10 establishes a communication path for relaying data through the constellation of satellites 12 between any two SUs 26, between SCS 28 and GW 22, between any two GWs 22 or between SU 26 and GW 22.

Figure 2:
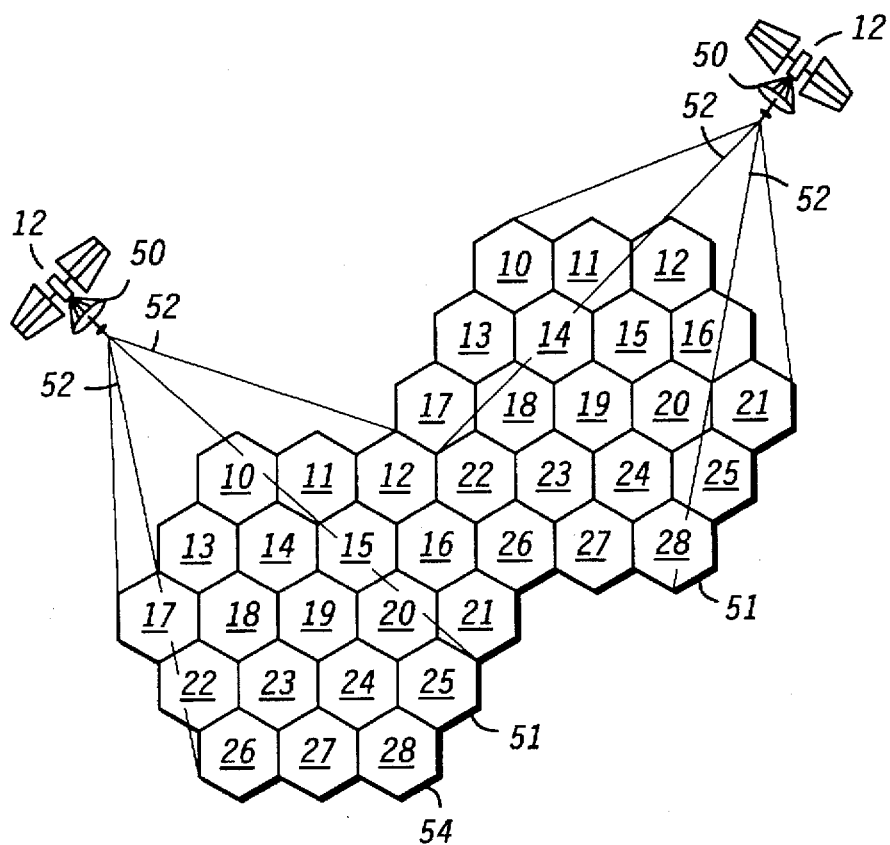
FIG. 2 schematically illustrates a cellular footprint pattern formed on the surface of the earth by a satellite suitable for use in a preferred embodiment of the present invention.

FIG. 2 schematically illustrates a cellular footprint pattern formed on the surface of the earth by a satellite suitable for use in a preferred embodiment of the present invention. Each satellite 12 includes a multibeam, directional antenna 50. Each antenna 50 projects numerous discrete antenna beams or cells 52 toward the earth's surface at numerous diverse angles away from its satellite 12. FIG. 2 shows a diagram of a resulting pattern of cells 54 that beams 52 form on the surface of the earth. Each beam 52 is associated with a cell 54 in a one-to-one correspondence, and each cell 54 represents the area defined by the intersection of a beam 52 with the surface of the earth. Each cell 54 within footprint 28 occupies a unique position within footprint 28. In the preferred embodiment of the present invention, all satellites 12 are configured substantially as depicted in FIG. 2. Thus, other satellites 12 (not shown) form other similar footprints (not shown). Desirably, a continuous blanket of cells 54 substantially covers the entire surface of the earth.

Those skilled in the art will appreciate that multiple beams 52 formed by antenna 50 define a geometry and do not imply a particular direction of communication. In other words, communications may be transmitted and/or received through the beams 52 projected by antenna 50 toward the earth's surface. Other antennas (not shown) on satellites 12 extend communications to other satellites 12 and/or GWs 22 and ETs 24.

Figure 3:
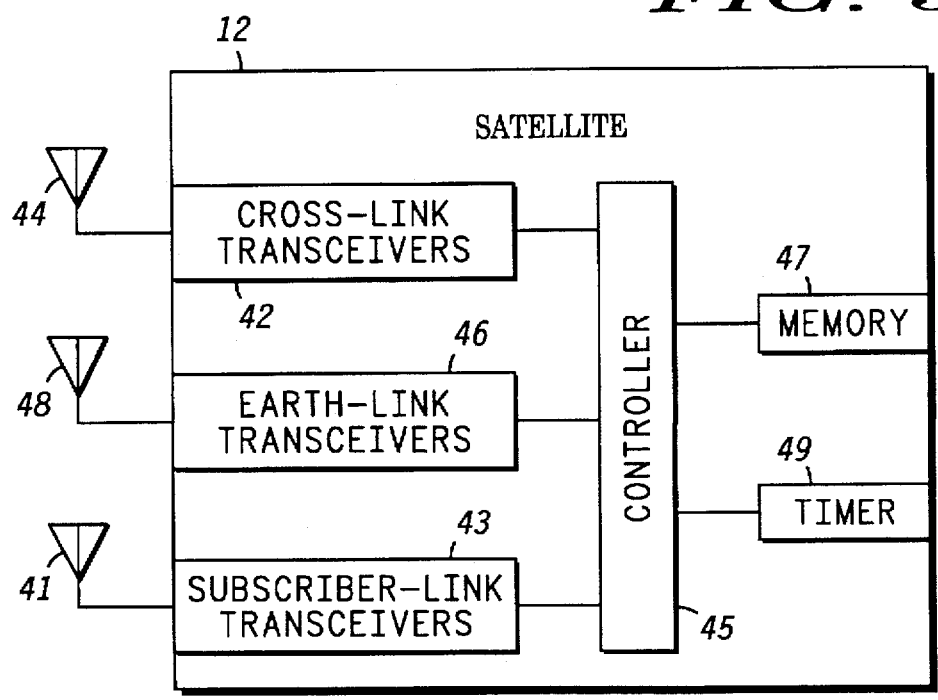
FIG. 3 illustrates a simplified block diagram of a satellite radio communication station suitable for use in a preferred embodiment of the present invention.

FIG. 3 illustrates a simplified block diagram of a satellite radio communication station suitable for use in a preferred embodiment of the present invention. Preferably, all satellites 12 within system 10 (see FIG. 1) include equipment as illustrated. Satellite 12 includes cross-link transceivers 42 and associated antennas 44. Transceivers 42 and antennas 44 support cross-links to other nearby satellites 12. Earth-link transceivers 46 and associated antennas 48 support earth-links to communicate with earth terminals 24 (FIG. 1). Subscriber-link transceivers 43 and associated antennas 41 support subscriber units 26 (FIG. 1). Preferably, each satellite 12 may simultaneously support a link for up to several thousand or more of subscriber units 26 (FIG. 1). Of course, those skilled in the art will appreciate that antennas 41, 44, and 48 may be implemented either as single multi-directional antennas or as banks of discrete antennas.

A controller 45 couples each of transceivers 42, 43, and 46 as well as to a memory 47 and a timer 49. Controller 45 may be implemented using one or more processors. Controller 45 uses timer 49 to maintain, among other things, the current date and time. Memory 47 stores data that serve as instructions to controller 45 and that, when executed by controller 45, cause satellite 12 to carry out various procedures. In addition, memory 47 includes variables, tables, and databases that are manipulated during the operation of satellite 12.

Subscriber-link transceivers 43 are desirably multi-channel FDMA/TDMA transceivers capable of transmitting and receiving on all different selectable frequencies during particular, selectable, time slots as directed by controller 45. Subscriber-link transceivers 43 contain multi-channel radios having sufficient number of channels to provide the desired number of transmission and reception frequencies for signal access and control and for the user voice and/or data. Controller 45 may provide for allocation of the frequency and time-slot assignments, cell-to-cell hand-off and other overhead and management and control functions. Subscriber-link transceivers 43 desirably provide for transmission and reception on any channel so that each subscriber-link transceivers 46 may, if needed, utilize the entire spectral capacity of all channels by having the capability to handle all frequency and time slot assignments.

Subscriber-link transceivers 46 in conjunction with subscriber-link antennas 41 project a plurality of antenna beams or cells on the surface of earth (See FIG. 2). Preferably, the antenna beams implement a spectral reuse plan such that channels are reused throughout an antenna pattern provide by satellite 12. In the preferred embodiment, each satellite provides at least forty-eight cells which comprise the antenna pattern of one satellite.

Figure 4:
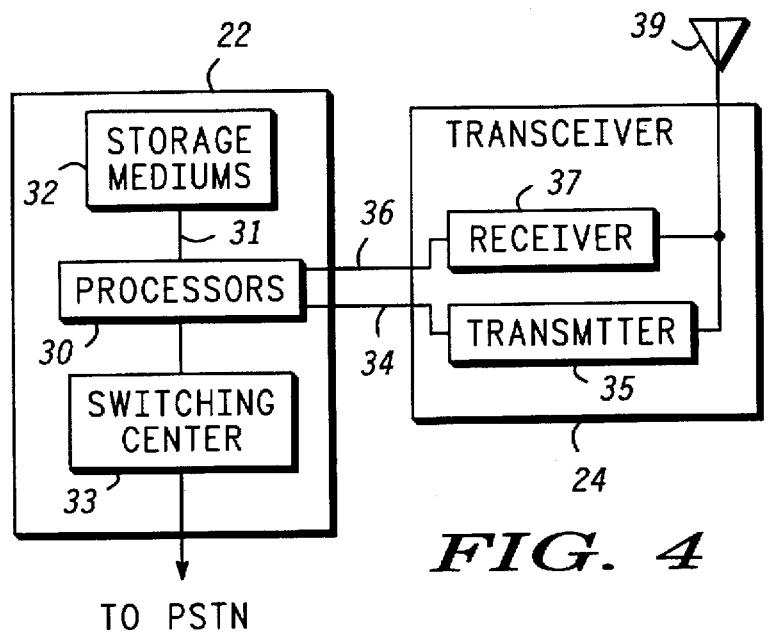
FIG. 4 illustrates a simplified block diagram of an earth terminal and gateway suitable for use in a preferred embodiment of the present invention.

FIG. 4 illustrates a simplified block diagram of an earth terminal 24 and gateway 22 suitable for use in a preferred embodiment of the present invention. Gateway 22 includes processors 30 coupled to associated storage mediums 32 (e.g., random access memory or RAM, other semiconductor or magnetic read-write memory devices, optical disk, magnetic tape, floppy disk, hard disk etc.) via link 31. Earth terminal 24 includes antenna 39 coupled to transmitter 35 and receiver 37 via link. Transmitter 35 and receiver 37 are coupled to processors 30 via links 34 and 36, respectively. Processors 30 desirably carries out procedures exemplified below and described in the associated text. Processor 30 preferably includes channel assignment controllers. For example, in addition to performing other tasks as appropriate, processor 30 desirably stores results from such procedures in storage mediums 32. Transmitter 35 and/or receiver 37 transmit messages to and/or receive messages from satellites 12.

Processor 30 generally controls and manages user access, message reception and transmission, channel set-up, radio tuning, frequency and time slot assignment, and other cellular radio communication and control functions. Among other things, processor 30 desirably executes procedures to allow user access to communication system 10. This may include procedures for protocols for channel setup and other associated functions as discussed below.

Earth terminal 24 provides an RF interface to communication satellites 12 (FIG. 1) as discussed above. Processors 30 of gateway 22 include an earth terminal controller (not shown) which interfaces switching center 33 to satellites 12

(FIG. 1). The earth terminal controller provides an interface between subscriber units and switching center 33. Switching center 33 provides an interface to a PSTN.

A non-geosynchronous orbit (NGO) mobile satellite system contends with the motion of the satellite antenna beam coverage areas relative to the subscribers connected to the system through those beams. The satellite beams sweep over the earth's service at such a high rate of speed that a given subscriber will move through a number of beams in the course of a particular call and in most cases, a subscriber will be serviced by two or more different satellites during a call.

Typically, a cellular communication system deals with the satellite motion by "handing-off" subscriber units from beam to beam or satellite to satellite when the subscriber unit detects that better service is available in a new beam. Whenever one of these hand-offs occurs, the subscriber unit is assigned a new time/frequency channel in the new beam. Each of these hand-off events requires the exchange of signaling data between the satellite and the subscriber unit. If these signaling messages are not received in a timely manner, the call may be dropped when the current beam no longer provides enough signal strength to maintain the link.

The hand-off rate increases rapidly as the number of beams is increased to provide more antenna gain better link performance or a smaller channel reuse distance. In the preferred embodiment illustrated in FIG. 1, there are 48 beams per satellite 12. As a result, subscriber units hand-off from beam to beam about once per minute on average and between satellites about once in five minutes on average. If the number of beams is increased by a factor of four or more or larger number of satellites are used, the beam to beam hand-off interval may be reduced to 15 seconds or less. The additional processing and bandwidth required to support this increased hand-off rate, along with the loss in call completion reliability creates an untenable situation for these "minibeam" system concepts.

A second problem with the channel to channel hand-off is that channels must be available to receive the hand-off. If no free channel exists in the requested beam, the hand-off cannot be completed and the call may drop. To avoid dropping calls, a flow control may be employed to block new acquisitions into a beam and maintain a pool of empty channels available for hand-offs.

The present invention provides, among other things, at least two embodiments that, among other things, reduce the hand-off rate in a minibeam NGO system. Both of these embodiments reduce the hand-off processing and enhance the hand-off reliability by making the hand-offs essentially transparent to the subscriber units. The first embodiment, referred herein as "sticky channels", includes assigning a channel to a subscriber unit when it first connects with the system that it continues to use as long as it remains connected. Thus, the channel is handed off from beam to beam and satellite to satellite along with the subscriber. The second embodiment herein referred to as "tacky channels", is similar to sticky channels except that the subscriber unit is assigned to a new channel when it is handed off from one satellite to another.

The sticky channel embodiment avoids handing a subscriber unit from channel to channel by having a subscriber unit remain on the same channel as long as it is connected to the system. The sticky channel embodiment preferably uses channel correlation cost functions to assign channels. In this embodiment, each user is assigned a channel that is non-interfering, preferably no matter how the system geometry and user load evolves in the future. This is accomplished by a subjecting a candidate channel to a stringent interference test before it is assigned to a user. For example, when a subscriber unit requests a channel assignment, each channel is tested against other channels that are currently active. This test checks for reuse of a particular channel and for any channel that could potentially cause interference due to differential Doppler shift ("frequency slide") or differential time delay ("time slide") under any possible combination of satellite to user geometry. Thus, a set of channels that are currently on the served by the same satellite and therefore immune to frequency or time slide at the moment may be disallowed because if they were served by different satellite at some later time, they would potentially interfere with each other.

Figure 5:
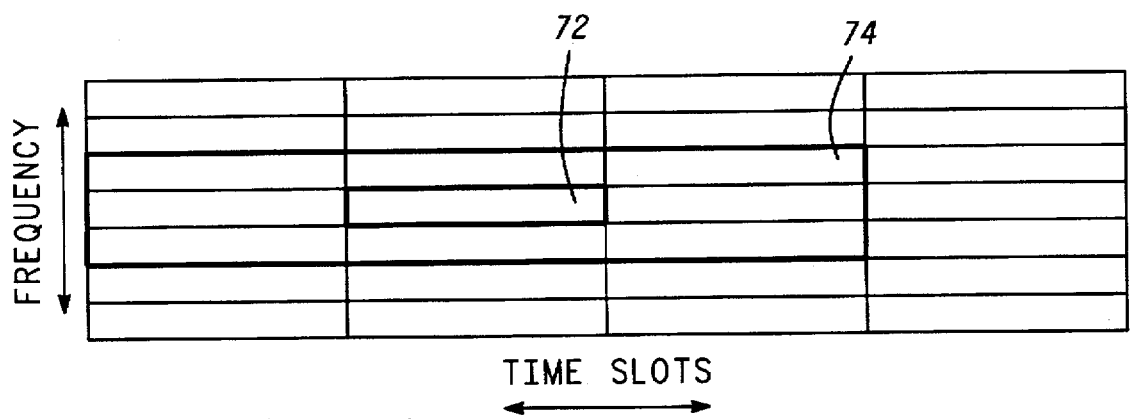
FIG. 5 illustrates an example of frequency and time division multiplexed channels.
Figure 6:
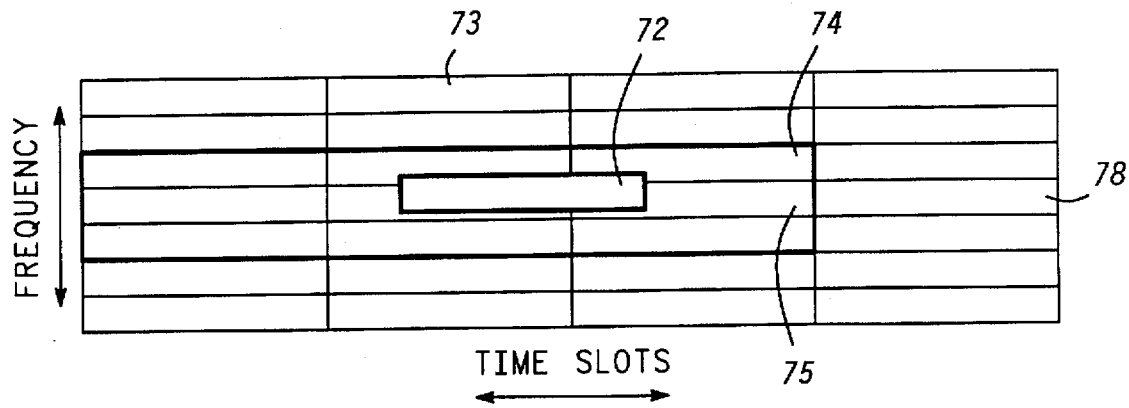
FIG. 6 illustrates an example of frequency and time division multiplexed channels that may be excluded due to frequency and time shift.

The exclusion rule is illustrated in FIG. 5 which illustrates an example of frequency and time division multiplexed channels. Channel 72 is non-interfering with any other channel due to time or frequency orthogonality. This condition exists as long as the channels are all serviced by the same satellite. Never-the-less, the exclusion rule precludes the use of the gray shaded channels in the figures. The motivation for this exclusion is shown in FIG. 6 which illustrates an example of frequency and time division multiplexed channels that may be excluded due to frequency and time shift. Channel 72 is now served by a different satellite so that its energy arrives at the original satellite (or the subscriber units operating with the original satellite) delayed in time and at a positive Doppler shift relative to the channels served by the original satellite. Channel 72 excludes the use of all shadowed channels 74

The channel assignment procedures couple the time/ frequency exclusion rules with a spatial isolation rule. Fundamentally, the procedure imposes the time/frequency exclusion between two channels unless the two channels are spatially isolated by at least some criteria. The two basic spatial isolation criteria have been evaluated using constellation models and include are antenna isolation and distance.

Antenna isolation provides direct control over the interference potential between channels, but it is complicated to evaluate and is sensitive to variations in antenna patterns from satellite to satellite and over time.

The geometric distance between the centers of the beams servicing two channels is not as direct a measure of isolation as antenna isolation, but it is much easier to compute and relatively insensitive to antenna pattern variations and satellite motion. This criteria may be, however, more restrictive than strictly necessary. This is because the exclusion zone around a beam is approximately a circle, while the actual beam energy is predominantly restricted to a directional region. In addition, distance rules generally use the same distance criteria regardless of which beams are involved, while in reality, the size of the interference area of different beams varies considerably, with that of the outer beams much larger than that of the inner beams in the satellite coverage region. Because the channel assignments are desirably valid between subsequent cells and subsequent satellites for hand-offs between beams, distance rules are preferably used instead of antenna isolation.

Two embodiments of the present invention apply spatial isolation to the channel assignment process. The first embodiment imposes a minimum distance or antenna isolation criterion. In this embodiment, a channel is used as long as the it meets the isolation criterion relative to all channels currently in use. The second embodiment maximizes the isolation between any two potentially interfering channels for the current load demand. This embodiment adapts the isolation criterion as a function of the demand. In areas with low demand, very restrictive isolation rules are preferably used. As the demand for channels increases, the isolation rules are relaxed up to the point that all of the demand is satisfied or until a minimum acceptable isolation is reached. If the minimum isolation criterion is reached, no new channels are assigned to avoid unacceptably low quality of service. This embodiment has been shown to provide more capacity at better carrier to interference than the minimum isolation embodiment.

Preferably, the maximum isolation rule is implemented as an iterative application of the combined time/frequency exclusion rule and minimum spatial isolation rule. The spatial isolation criterion is initially set to a very restrictive value and then relaxed for each iteration. All channels available that meet the isolation and exclusion criterion for that iteration are granted. This process is preferably repeated until all channel requests are granted a channel or until a maximum iteration is performed where the minimum isolation is reached. This approach is effective, but time consuming due to its iterative nature. The correlation cost function discussed below provides a way to implement the maximum isolation rule with a non-iterative process.

Briefly, the correlation cost technique includes assigning a correlation index for every channel pair based on their interference potential over all possible values of time and frequency slide. This correlation index is combined with the distance between the two channels to provide a measure of the interference cost of using that channel pair in that situation. The maximum isolation rule may be implemented by choosing the channels that provide the minimum cost. The minimum isolation limit is preferably retained as a maximum acceptable cost that no channel assignment will be allowed to exceed. This approach avoids the time consuming iterations. In the preferred embodiment, the correlation's between channels are precomputed and stored as a matrix, so that only the distance part of the cost function has to be computed when the assignment is made.

Antenna beam based channel assignments are those in which the channel resources are carried along with the satellites as they orbit. From time to time, resources are reallocated from one satellite to another to provide the greatest capacity on satellites serving the areas of high demand, but these channel allocations remain essentially satellite beam based. The sticky channel embodiment shifts the channel allocation emphasis from the satellite to the subscriber units. Once a subscriber unit is granted a channel, it remains on that channel as long as it remains connected to the system. This embodiment relies on the assumption that the users are essentially stationary relative to the satellite motion. Thus, the relative isolation between two users remains nearly constant as long as they remain on the system. Since an average call duration is approximately 4 minutes, this assumption is valid even for fast moving users such as those on aircraft.

One major advantage of sticky channels is that there is no need to maintain a hand-off pool of channels to insure that a subscriber unit always has a channel available as it is handed off from beam to beam. In the beam based channel assignment technique, as many as 20% to 30% of the channels must be reserved for this purpose to avoid excessive instances of dropped calls. This is accomplished by blocking new calls when most of the channels available in a beam are occupied. With sticky channels, no such pool of reserved channels is necessary, because once a subscriber unit is assigned a channel, it is effectively reserved for it in all beams for the duration of the call.

Another advantage of sticky channels is that it reduces the signaling overhead for hand-offs. As long as a subscriber remains on the same satellite, the satellite can move its channel from beam to beam as necessary without any interaction with the subscriber unit. Such interaction is only unavoidable when the subscriber is handed off from one satellite to another, because it must be alerted to synchronize with the new satellite. Even in this case, the signaling is minimized because it is not necessary to inform the subscriber unit of the channel identity on the new satellite. This reduction in hand-off signaling becomes very important as the number of beams in the system is increased. For example when the number of beams per satellite is on the order of 200 or more, a hand-off rate of once every 5 to 10 seconds may result. The signaling overhead and reliability of a system that changed user channels at this rate would be completely unacceptable.

In the sticky channel embodiment, an assigned channel restricts the use of eight other channels due to the potential for time and frequency slide between satellites. (FIG. 6) When all of these channels are served by the same satellite, however, they are completely non-interfering. Although neighboring channels do not interfere with one another when they are operated on the same satellite, sticky channels cannot take advantage of this fact because it must allow for the channels to transfer different satellites as the satellites move relative to the users. This results in applying restrictive assignment rules which lowers the available capacity.

In the tacky channel embodiment of the present invention, a subscriber unit remains on its assigned time/frequency channel as long as it remains connected to a particular satellite. When the subscriber unit is handed-off from one satellite to another, it is assigned a new channel. The advantage of tacky channels over sticky channels is that the assignment process can take advantage of the time and frequency orthogonality that exists between channels on the same satellite, but is lost when the same channels are on different satellites. This increases the load carrying capacity by 300% over sticky channels, while maintaining the same carrier to interference performance.

In the tacky channel embodiment, a subscriber is assigned a new non-interfering channel each time it connects to a new satellite. To understand this, refer back to FIG. 5 and consider the following situation. Assume that a new channel is requested in a beam on an satellite and that the channel 72 is already operational in a nearby beam of that satellite. The tacky channel assignment process would not reuse channel 72, but assigns any of the channels 74. Note that the sticky channel process avoids assigning the channels 74 as well as channel 72 to the new request, thus precluding a total of nine channels instead of the one precluded by tacky channels. Note also, that the interference potential of the tacky channel assignment is as low as that achieved by the sticky channel assignment at that time.

Now consider the time when the subscriber with the recently assigned channel must be handed off to a new satellite, and assume that the channel 72 is still active. Now, as shown in FIG. 6, the channel 72 could interfere with channels 74 due to time or frequency slide. The tacky channel process assigns a new channel to the subscriber, but because channel 72 is on a different satellite, it will use the same exclusion rule as sticky channels and avoid the channels 74. Thus, the tacky channel embodiment avoids the interference due to operation on different satellites the way sticky channels does, but only when it is necessary. By always assigning a new non-interfering channel whenever the potential for time/frequency slide interference changes, tacky channels force the system to evolve in a way that preserves good carrier to interference performance.

The tacky channel embodiment retains the major advantage of sticky channels. As long as a subscriber remains on an satellite, beam to beam hand-offs can be accomplished without subscriber interaction. Thus, like sticky channels, tacky channels can support the high beam to beam hand-off rates encountered in system concepts with a large number of beams per satellite.

The price paid for tacky channel operation instead of sticky channels is that the hand-off pool is again required to insure that channels are available for inter-satellite hand-offs. This loss in capacity has, however, is relatively minor compared to the loss due to the unnecessarily strict isolation requirements of sticky channels.

The signaling requirements of tacky channels are marginally more complex than those of sticky channels. A new channel assignment must be transmitted during the tacky channel inter-satellite hand-off process. This signaling increase is small because inter-satellite hand-offs occur an average of about once in 5 minutes, and, as mentioned above, some indication of inter-satellite hand-offs are sent to the subscriber unit when using sticky channels for synchronization purposes.

The adaptive channel management process discussed above is suitable for use in a preferred embodiment of the present invention. Channels are assigned by striking a balance between the isolation between nearby channels and the peak capacity in an area. Thus, in areas of light demand the system maintains very high channel isolation, but in areas of high traffic demand, isolation is reduced to allow greater capacity. Of course, the isolation can only be reduced up to some limit before the channels become unusable due to interference.

In the adaptive channel management process, the relative interference potential or equivalently the isolation between channels under the current operating conditions is determined. In general, there are two components of channel isolation, physical separation and channel orthogonality- Physical separation achieves isolation by antenna pattern and path loss, while channel orthogonality achieves isolation by factors such as time separation, frequency separation, antenna polarization, pulse shaping and coding. The interference avoidance techniques in the earlier adaptive channel management processes used discrete and relatively coarse measures for isolation.

In one embodiment of the present invention, an improved method for determining the isolation between channels is provided. The method uses substantially continuous measures of separation and channel orthogonality to generate a more precise measure of the interference potential between two channels. This measure is used in the channel assignment process to represent the "cost" of using a channel in the presence of other already active channels- The system maintains an optimum balance between interference and providing adequate capacity to meet the current demand, by choosing the minimum cost channel assignment.

The following describes a procedure for determining the isolation between two channels suitable for use in a preferred embodiment of the present invention. This embodiment has computational efficiency advantages and avoids multiple loop searches and allows most of the interference calculations to be made off line and stored for future reference. Operational analysis techniques such as integer programming are considered in the software.

In general, there are two ways to isolate channel allocations so that users operating on one channel do not interfere with users operating on a second channel. The first way is to utilize time and/or frequency separation.

In reference to FIG. 6, channel 72 cannot possibly interfere with channel 78 since there is more time separation between the time slots than the system can produce from time slide. Similarly, channels 72 and 73 are so far separated in frequency that no amount of frequency slide that the system can produce will cause a user on channel 72 to interfere with any user on channel 73. Accordingly, channels 72 and 78 could be assigned to the same beam, or adjacent beams regardless of which satellite each beam is associated with. Likewise, channels 72 and 73 could be assigned to the same beam, or adjacent beams regardless of which satellite each beam is associated with.

In one embodiment of the present invention which uses Code Division Multiple Access (CDMA), code isolation, which is a special case of time and frequency isolation, is used in this isolation factor.

A second way to isolate channels is using antenna isolation. If two beams are physically so far apart that each beam contributes very little signal strength to the coverage area of the other beam, then the same channel can be assigned to both beams, with little chance of interference. Since in the preferred embodiment, the satellites are moving with respect to the subscriber units, the actual antenna beam isolation changes with time and therefore, antenna isolation is more difficult to use as an isolation metric. The distance between the subscriber units, however remains relatively constant over the duration of a telephone call, for example. This generally true even for rapidly moving subscriber units in aircraft, in part due to the area covered by an individual antenna beam. Furthermore, the size of the area covered by an individual antenna beam remains relatively constant from beam to beam. Therefore, the physical separation between subscriber units can be used as an indicator of the effective antenna isolation between two subscriber unit locations. The location of the subscriber units is preferably found by a channel manager using a variety of ways well know to those of ordinary skill in the art. In the preferred embodiment, the area covered by an individual antenna beam is relatively small (i.e. approximately 15,000 square km). In this embodiment, the subscriber units are assumed to be at the antenna beam center location for the purpose of determining antenna beam isolation. However, more precise subscriber unit locations may also be used.

In one preferred embodiment, a cost function is derived which quantifies the "cost" or "interference potential" of using channel "a" at a location served by a first satellite while using channel "b" at a location served by a second satellite. To do this, a function $CORR_{ab}$ is preferably defined which is a measure of the time/frequency isolation available between two channels assumed to be assigned to different satellites so that time and/or frequency slide may be a factor. The function $CORR_{ab}$ quantifies time/frequency type isolation and not the .type of isolation that results from physical separation between the subscriber units assigned to the two channels. If $CORR_{ab}=0$, then channels "a" and "b" are uncorrelated, i.e., they can be used in close proximity without any interference whatsoever, even considering time and frequency slide. A high value of $CORR_{ab}$ would indicate a high degree of correlation between channels "a" and "b" in a time/frequency slide environment. Utilization of these two channels by nearby users communicating with different satellites may induce high amounts of system self interference. The function is independent of satellite geometry and is preferably pre-computed for use by the procedures described below. In the preferred embodiment the formula used to pre-compute function $CORR_{a,b}$ is:

$$CORR_{a,b} = \sum_{dt=-tmax}^{tmax} \sum_{ts=-9ms}^{+9ms} \sum_{fs=-35kHz}^{35kHz} Ovlap(Chnla, Chnlb)$$

The term "dt" represents discrete time samples taken at intervals small compared to the burst duration. In the preferred embodiment, the burst duration is about 8.2 msec. The term "tmax" represents some value higher than twice the maximum differential time slide value, which is 9 milliseconds in the preferred embodiment. The term "ts" represents time slide. The term "fs" represents frequency slide. The term "$chnl_a$" represents a specific combination of a frequency and time-slot defined as channel "a". The term "$chnl_b$" represents a different specific combination of a frequency and time-slot defined as channel "b". The term "Ovlap($chnl_a$, $chnl_b$)" represents fractional overlap between $chnl_a$ and $chnl_b$, if $chnl_a$ is active at time dt and $chnl_b$ is active at time dt+ts (lies in the range [0, 1]); zero otherwise. The term "9 ms" represents 9 milliseconds which is the maximum amount of differential propagation delay that one subscriber unit can experience when seeing two different satellites in the preferred embodiment. The term "35 kHz" represents the maximum amount of differential Doppler that one subscriber unit can experience when seeing two different satellites in the preferred embodiment.

The summations in the correlation function (above) are preferably computed for all possible channels "a" and "b", and the results are preferably stored in a N×N correlation matrix, where "N" is the total number of channels in the system. Since the number of channels and their characteristics are system constraints, the correlation matrix is preferably computed once (for example, during the system design) and stored for later use.

Figure 7:
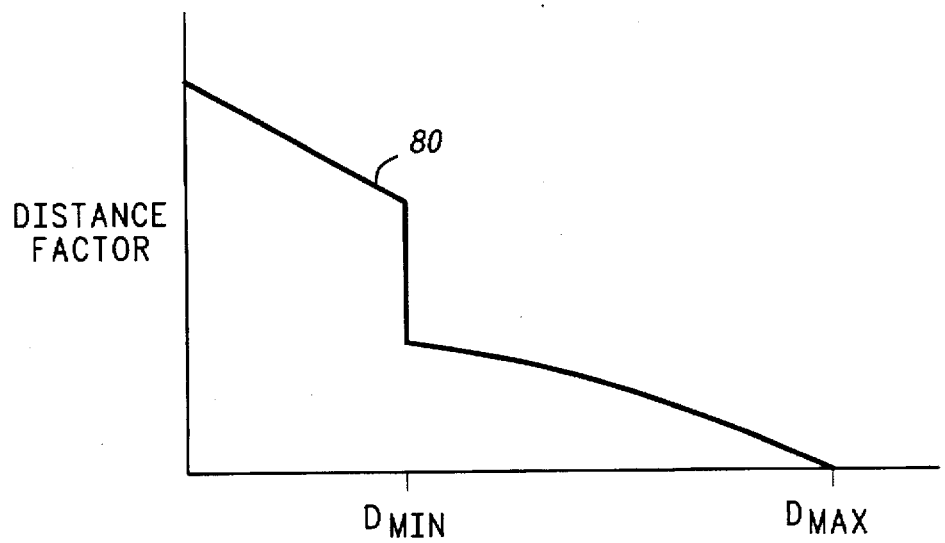
FIG. 7 illustrates a distance factor function used for assigning channels in a preferred embodiment of the present invention.

Now that the first type of isolation has been quantified, the degree of isolation obtained from physically separating two subscriber units is quantified. A "distance factor" (DF(AB)) which expresses the cost of using a channel at a location within "AB" kilometers of another subscriber unit using an identical channel. FIG. 7 illustrates a distance factor function used for assigning channels in a preferred embodiment of the present invention. FIG. 7 depicts the function used to define DF(AB). The distance factor 80 is preferably calculated in real-time for each pair of channels for which the cost function is computed.

Dmax is the distance by which two subscriber units would have to be separated such that the procedure no longer analyzes an interference cost for channel assignments made outside that distance. In other words, the antenna isolation portion is so large that time/frequency isolation need not be considered.

Dmin is the minimum distance that two identical channel assignments may be made. Dmin defines the limits of tolerance for self-interference and is the primary operator control of capacity vs. the carrier interference ratio. Below Dmin, requires essentially perfect time/frequency isolation ($CORR_{ab}=0$) for two channel assignments to be compatible. Note: the DF(AB) function is heuristic and assigns an arbitrary high cost for operation within Dmin. In practice, a high DF(AB) may combine with a low $CORR_{ab}$ to produce an acceptable channel assignment. This may happen with frequency slide only cases, such as channels 72 and 75 (FIG. 6). The "10" factor on the DF(AB) function is arbitrary and represents a value that works well in practice.

In the preferred embodiment, the time and frequency isolation factor ($CORR_{a,b}$) and the distance isolation factor (DF(AB)) are combined into a cost function (CF(A,B)) by the following formula:

$$CF(A,B) = CORR_{a,b} \times DF(AB).$$

In other embodiments of the present invention, factors may be included to weight the isolation factors with respect to each other.

To determine the isolation between a candidate channel and an assigned channel without time or frequency slide, proceed as follows. When channel "a" is the same as channel "b", look up the $CORR_{a,a}$ on the diagonal of the correlation matrix. Otherwise, when channel "a" is not the same as channel as channel "b", the correlation is zero. The distance factor DF(A,B) is computed as the distance between the center of the beam where active channel "a" is currently being used and the center of the beam where the new channel is requested. In the preferred embodiment of the present invention, the distance between beam centers are stored in a beam distance matrix since the beams on the same satellite do not move. The beam distance matrix is similar to the correlation matrix. The cost function CF(A,B) is computed using the above definition and the result is stored.

To determine the isolation between a candidate channel and an assigned channel with time and frequency slide, proceed as follows. The $CORR_{a,b}$ factor is looked up in the correlation matrix. The distance factor DF(A,B) is computed as the distance between the center of the beam where active channel "a" is currently being used and the center of the beam where the new channel is requested. This computation is preferably done in real-time based on the beam geometry and satellite locations. The cost function CF(A,B) is computed using the above definition and the result is stored.

The use of a precomputed correlation matrix and precomputed distance factors discussed above reduces the computational complexity. However, some computational complexity remains in the computation of the distance between beam centers when channels are on different satellites.

In an alternative embodiment of the present invention, the actual location of the subscriber units are know by the satellite through a geolocation process. The distance between subscriber units is computed directly without reference to beam centers. In another embodiment, the subscriber units compute their location through a geolocation process. When a subscriber unit requests a channel, the subscriber unit transmits it's location to the satellite which relays the location information to the channel assignment controller which stores the locations of the subscriber units. The locations of the subscriber units are used in cost-function computations when a new channel is requested.

The cost function CF(AB) are used as a metric of isolation in the other processes of the channel assignment controller that may use isolation. For example, when a channel is assigned with a maximum isolation, the channel with the lowest cost function is assigned. Although the preferred embodiment of the present invention uses the cost function CF(AB) as defined above as a metric for isolation, other isolation metrics may be used. For example, distance between subscriber units with any potentially interfering channel may also be used without computing the degree of potential interference represented by the cost function.

Figure 8:
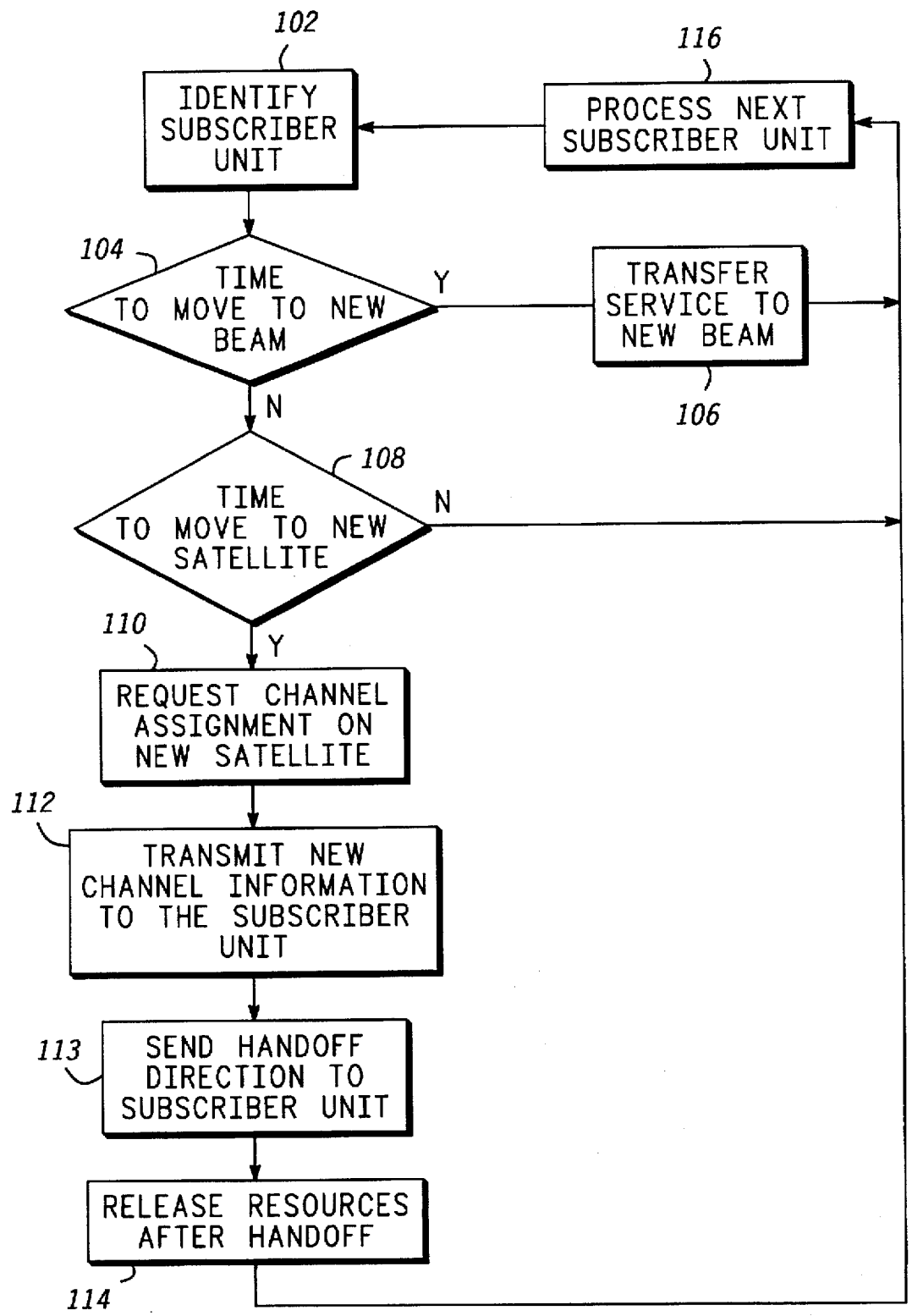
FIG. 8 illustrates a channel assignment procedure suitable for use in a preferred embodiment of the present invention.

FIG. 8 illustrates hand-off procedure 100 suitable for use in a preferred embodiment of the present invention. In the preferred embodiment, procedure 100 is performed by gateway 22 (FIG. 1) and ET 24 in conjunction with satellite 12 (FIG. 1). In another preferred embodiment, procedure 200 is performed by SCS 28 (FIG. 1) and ET 24 in conjunction with satellite 12=(FIG. 1) as part of channel management processes. In one embodiment, an assigned channel is selected such that it will remain assigned to the subscriber unit through the duration of the call, even though the subscriber unit transitions through several antenna beams and satellites. Procedure 100 is used to hand-off communications from a present antenna beam to a next antenna beam at the appropriate time.

As shown, procedure 100 performs a loop of tasks that is performed continuously, one time for each subscriber unit currently being serviced by a specific satellite. Task 102 identifies a subscriber unit currently being served by the satellite.

Task 104 determines when it is time for that subscriber unit to move to another beam on the same satellite that the subscriber unit is currently communicating. Task 104 determines when a new antenna beam will be necessary to continue communications between the satellite and the subscriber unit. In other words, task 104 determines when a hand-off will be necessary. In the preferred embodiment, because the movement of satellites is known, and the movement of a subscriber unit is relatively slow compared to that of the satellites, it is known which antenna beam will subsequently be serving a subscriber unit based that is currently communicating with a satellite. Furthermore, the locations of the subscriber units within an antenna beam may be known.

When the next beam is on the same satellite as the current beam, task 104 may determine when next beam is needed in several ways well known in the art. For example, in one embodiment, a satellite may activate the currently assigned communication channel (i.e., the same frequency and time slot) in the next antenna beam and compare the subscriber unit's received signal in both antenna beams. When the received signal in the next antenna beam is greater that the received signal in the current antenna beam by at least a predetermined amount, it is time for switching communications to the next antenna beam. In this embodiment, the received signal in the next antenna beam would preferably exceed the received signal in the current antenna beam by a predetermined amount for at least a certain amount of time.

In another embodiment, task 104 determines when a next antenna beam is needed based on the location of the subscriber unit and knowledge of the satellite's motion.

When task 104 determines that a new beam antenna beam on the same satellite is needed, task 106 is executed. Task 106 transfers communication services to the new antenna beam. In general, a satellite providing the current and next antenna beams switches communications with that subscriber unit from the current antenna beam to the next antenna beam by activating the assigned channel in the next antenna beam, and subsequently deactivating the assigned channel in the (previously) current antenna beam. After task 106, the channel resources within the previous beam are released.

During the performance of task 106, the subscriber unit is unaware that a hand-off is taking place between antenna beams of a single satellite. The subscriber unit remains communicating on the same frequency and time slot as it communicated on in the prior antenna beam. Note also that when both of the antenna beams are provided by the same satellite, the subscriber unit does not have to compensate for a change in frequency due to different Doppler, nor does the subscriber unit have to compensate for a different time delay to the satellite.

After task 106 is performed, the subscriber unit is operating on another antenna beam of the same satellite. After task 106, task 116 is performed. Task 116 then selects the next subscriber unit serviced by that satellite for processing by procedure 100.

When task 104 determines that a new beam antenna beam on the same satellite is not needed, task 108 determines if a new antenna beam is needed which is provided by another satellite. In general, task 108 may be performed in several ways, including those discussed above. Because the subscriber unit's location is know by the SCS controller, and the antenna beam pattern for a particular satellite is known, it can be determined when the next antenna beam that will service the location of the subscriber unit is provided by a different satellite.

When task 108 determines that is not time to move to a new satellite, because of the combination of tasks 106 and 108, it is not time to transfer the subscriber unit and task 116 is performed. Task 116 then selects the next subscriber unit serviced by that satellite for processing by procedure 100.

When task 108 determines that it is time to move to a new satellite, task 110 is performed. Task 110 requests a channel assignment on the new satellite. In the sticky channel embodiment of the present invention, the same channel that the subscriber unit is currently using is assigned on the new satellite. In the tacky channel embodiment, a new channel on the new satellite is requested although the new channel assigned may be the same channel previously being used by the subscriber unit. A suitable procedure for assigning a new channel on a new satellite for the tacky channel embodiment is discussed in procedure 200 (FIG. 9) below.

In the tacky channel embodiment, after a new channel is assigned, task 112 transmits the new channel information to the subscriber unit. Task 112 is not performed for the sticky channel embodiment of the present invention.

Task 113 directs the subscriber unit to hand-off to the new satellite. In the sticky channel embodiment, the subscriber unit will be handing-off to the same channel on the new satellite, while in the tacky channel embodiment, the subscriber unit will be handing-off to a newly assigned channel on the new satellite. The network routing controller is notified to direct data packets for the subscriber unit to the new satellite.

In the preferred embodiment shown in FIG. 1, during ongoing communications between a subscriber unit 26 and a satellite 12 (FIG. 1), the subscriber unit continually modifies its frequency and timing to compensate for the changing relative speed, relative direction and distance between the satellite and the subscriber unit.

In one embodiment, the subscriber unit resynchronizes itself with the new satellite. In another embodiment, task 113 instructs the subscriber unit to adjust its frequency and timing to compensate for difference in Doppler and timing with the next satellite when the hand-off to the next antenna beam occurs.

In task 114, the satellite which the subscriber unit was previously communicating releases the channel resources after the hand-off to the new satellite is complete. After task 114, task 116 is performed. Task 116 then selects the next subscriber unit serviced by the satellite for processing by procedure 100.

FIG. 9 illustrates channel assignment procedure 200 suitable for use in a preferred embodiment of the present invention. In the preferred embodiment, procedure 200 is performed by gateway 22 (FIG. 1) and ET 24 in conjunction with satellite 12 (FIG. 1). In another preferred embodiment, procedure 200 is performed by SCS 28 (FIG. 1) and ET 24 in conjunction with satellite 12=(FIG. 1) as part of the channel allocation processes. In the preferred embodiment of the present invention, procedure 200 initially assigns a communication channel to a subscriber unit that is requesting access to the communication system for both the tacky channel and sticky channel embodiments of the present invention.

Procedure 200 may also be used to assign a channel to a subscriber unit in the tacky channel embodiment when transitioning to a new satellite as part of task 110 of procedure 100 (FIG. 8) discussed above. Preferably, the channel assigned by procedure 200 is such that it will remain assigned to the subscriber unit through the duration of the call and transitions through several antenna beams on the same satellite. The order and method of performance of the tasks in procedure 200 is not important for the present invention.

In task 202, a channel request is initiated. In general, a channel request is initiated in several ways. For example, when a subscriber unit requests initial access to the communication system. In the tacky channel embodiment, a channel request is initiated when a hand-off to a new satellite is needed. In task 204, all subscriber units in an interference region are identified. The interference region surrounds the subscriber unit for which a new channel is to be assigned. The interference region is preferably approximately a circle around the subscriber unit with a predetermined radius. Desirably, the interference region is at least as large as the antenna beam where the subscriber unit is located, and preferably much larger.

Task 204 also located all subscriber units in this interference region, preferably using subscriber unit location data 206. The location data may be stored in an SCS or GW, and preferably includes the subscriber unit's antenna beam. Additional location data discussed above may also be used. Associated with the location data of the subscriber unit are satellite identifiers 208 which identify the specific satellite which is communicating with the subscriber units identified in task 204.

In task 210, a candidate channel is selected. The first time through task 210, a first candidate channel is selected. The loop of tasks 210–224 is repeated for each candidate channel. A candidate channel preferably includes any channels available to the communication system.

Task 212 selects a channel assigned to a subscriber unit in the interference region. The loop of tasks 212–222 is repeated for each channel assigned to a subscriber unit in the interference region (i.e., active channels). At this point in the procedure, an active channel and a candidate channel have been identified.

In the preferred embodiment where TDMA/FDMA communication channels are used, there are several thousand channels available for communication over links 16 (FIG. 1). A communication channels comprises, as a minimum, a frequency channel and a time-slot. Task 212 may use a matrix which shows all possible channels to indicate which channels are currently active channels, or on the other hand, designate the currently inactive channels.

Task 214 determines if the candidate channel and the assigned (active) channel are on the same satellite. If they are not on the same satellite, task 216 is performed. If the candidate channel and the assigned channel are on the same satellite, task 218 is performed.

Task 216 determines the isolation between the active channel and the candidate channel without time and frequency slide, while task 218 determines the isolation between the active channel and the candidate channel including time and frequency slide. In the sticky channel embodiment, tasks 214 and 216 are skipped, and the isolation is determined to include time and frequency slide in task 218. In the tacky channel embodiment of the present invention, tasks 214 determines whether the isolation is determined by task 216 or task 218.

Preferably, the isolation is determined in either task 216 or 218 using a cost function such as cost function CF(A,B) discussed above. The cost function preferably includes a distance factor, such as the distance factor DF(AB) discussed above, and preferably also include a correlation factor, such as $CORR_{a,b}$ discussed above. In general, if two channels have a non-zero cost function, there is some interference potential.

Task 220 stores the isolation determined in either task 216 or 218. After task 220, task 222 determines if there are remaining active channels to consider. When there are remaining active channels to consider, tasks 212–220 are repeated for each remaining active channel. When all active channels are considered, task 224 is performed.

Task 224 determines if there are any remaining candidate channels to consider. If there are remaining candidate channels to consider, tasks 210–222 are performed for each remaining candidate channel. When all candidate channels are considered, task 226 is performed.

Task 226 calculates a total isolation for each candidate channel selected in task 210. The total isolation for an candidate channel is preferably the sum of the isolations associated with a candidate channel when compared to each active channel selected in task 212. For example, when task 220 stores the isolations in a matrix that conceptually lists the candidate channels horizontally (in columns), and the active channels in the interference region vertically, the total isolation for a particular candidate channel would be the sum of the isolations in that column.

In task 228, the total isolations for each candidate channel are compared and the candidate channel having the lowest total isolation is selected. When several candidate channels have the same lowest total isolation coefficient, any of those inactive channels may be chosen. Task 228 assigns that channel having the lowest total isolation to the subscriber unit for which the channel is being initiated in task 202.

In one embodiment of the present invention, task 228 assigns the candidate channel having the lowest isolation calculated in task 216 or task 218, rather than assigning the candidate channel having a lowest total isolation.

In other embodiments of the present invention, task 228 assigns the candidate channel to the subscriber unit when the isolation meets some criteria. The criteria, for example, may be a minimum level of isolation.

In one embodiment of the present invention, task 226 is performed before task 224. In this embodiment, the isolation for candidate channels is accumulated during the loop of tasks 210–224.

When the initiation of a channel request in task 202 is an initial request for access to the communication system, task 228 assigns that channel to the subscriber unit. In the preferred embodiment, gateway 22 or SCS 28 (FIG. 1) performs task 228 and notifies the satellite 12 of the channel assignment. Subsequently, the subscriber unit and the satellite begin communicating on the assigned channel.

When the initiation of a channel request in task 202 is a channel request for a hand-off to a new satellite, as in task 110 of procedure 100 (FIG. 8), task 228 notifies the new satellite of the channel assignment. Subsequently, the subscriber unit is notified of this assignment in task 112 (FIG. 8) and the subscriber unit and the new satellite begin communicating on the assigned channel.

Procedure 200 is shown as an iterative loop for clarity. In the preferred embodiment, the actual implementation uses more sophisticated programming techniques, such as integer programming, to, among other things, improve computational efficiency.

Note that during a typical call, a subscriber unit transitions through several antenna beams, and possible several satellites. For example, in the preferred embodiment shown in FIG. 1 where each satellite provides up to forty-eight antenna beams, a subscriber unit transitions between antenna beams approximately every few minutes. In addition, a subscriber unit transitions between satellites approximately every nine minutes. As can be seen, during an typical telephone call, many hand-offs may be required. The use of procedures 100 and 200 eliminates having to assign a new communication channel for every antenna beam allowing the subscriber unit to retain the same communication channel, for the most part, throughout an entire call.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of handing-off subscriber unit communications between cells provided by satellite nodes of a cellular communication system, said cells moving with respect to earth's surface, said method comprising the steps of:

first communicating with a subscriber unit over a first time division multiplexed (TDM) communication channel within a first cell of said cells, said first cell associated with a first satellite;

handing-off communications with said subscriber unit from said first cell to a second cell associated with a second satellite, wherein said second cell subsequently services at least a portion of a geographic region serviced by said first cell, said portion including a location of said subscriber unit; and second communicating with said subscriber unit within said second cell over said first communication channel, wherein the handing-off step includes the step of directing said subscriber unit to adjust subscriber unit time-slot reception and transmission times associated with said TDM channel for synchronization with said second satellite, and to adjust subscriber unit reception and transmission frequencies associated with said TDM channel for synchronization with said second satellite to allow said subscriber unit to communicate with said second satellite during the second communicating step, wherein the directing step, the adjusted times and frequencies associated with said first communication channel overlap with at least one adjacent communication channels, of a plurality of communication channels, and wherein the assigning step includes the step of assigning said first channel to the subscriber unit when said at least one adjacent communication channel is not assigned to another subscriber unit for communications with said first satellite, and wherein prior to the assigning step, said first communication channel is an available communication channel, and wherein the assigning step includes the steps of:

determining a time slot separation and frequency separation between available communication channels and communication channels assigned to subscriber units; and assigning said first communication channel from said available communication channels to said subscriber unit based on said time slot separation and frequency separation.

2. A method of handing-off subscriber unit communications between cells provided by different satellite nodes of a cellular communication system, said cells moving with respect to earth's surface, said method comprising the steps of:

first communicating with a subscriber unit over a first time division multiplexed (TDM) communication channel within a first cell of said cells, said first cell being provided by a first of said satellite nodes;

handing-off communications with said subscriber unit from said first cell to a second cell, said second cell being provided by a second of said satellite nodes, wherein said second cell subsequently services at least a portion of a geographic region serviced by said first cell, said portion including a location of said subscriber unit; and second communicating to said subscriber unit within said second cell, wherein the handing-off step includes the step of directing said subscriber unit to adjust subscriber unit time-slot reception and transmission times associated with said TDM channel for synchronization with said second satellite, and to adjust subscriber unit reception and transmission frequencies associated with said TDM channel for synchronization with said second satellite to allow said subscriber unit to communicate with said second satellite during the second communicating step, wherein the directing step, the adjusted times and frequencies associated with said first communication channel overlap with at least one adjacent communication channels of a plurality of communication channels, and wherein the assigning step includes the step of assigning said first channel to the subscriber unit when said at least one adjacent communication channel is not assigned to another subscriber unit for communications with said first satellite, and wherein prior to the assigning step, said first communication channel is an available communication channel, and wherein the assigning step includes the steps of:

determining a time slot separation and frequency separation between available communication channels and communication channels assigned to subscriber units; and assigning said first communication channel from said available communication channels to said subscriber unit based on said time slot separation and frequency separation.

3. A cellular communication system for handing-off subscriber unit communications between cells provided by satellite nodes, said cells moving with respect to earth's surface, said cellular communication system comprising:

a first transceiver for communicating with a subscriber unit over a first time division multiplexed (TDM) communication channel within a first cell of said cells;

a processor for handing-off communications with said subscriber unit from said first cell to a second cell of a second satellite, wherein said second cell subsequently services at least a portion of a geographic region serviced by said first cell, said portion including a location of said subscriber unit; and a second transceiver on said second satellite for communicating with said subscriber unit within said second cell over said first communication channel, wherein said processor directs said subscriber unit to adjust subscriber unit time-slot reception and transmission times associated with said TDM channel for synchronization with said second satellite, and to adjust subscriber unit reception and transmission frequencies associated with said TDM channel for Synchronization with said second satellite to allow said subscriber unit to communicate with said second satellite during the second communicating step;

wherein said processor determines a time slot separation and frequency separation between available communication channels and communication channels assigned to subscriber units; and wherein said processor also assigns said first communication channel to said subscriber unit based on said time slot separation and frequency separation.

* * * * *